Sept. 1, 1925.                                                1,551,875
P. W. HALL
MILL FOR GRINDING RUBBER MATERIAL
Filed April 18, 1923

Pirl Ward Hall, INVENTOR

Patented Sept. 1, 1925.

1,551,875

UNITED STATES PATENT OFFICE.

PIRL WARD HALL, OF AKRON, OHIO.

MILL FOR GRINDING RUBBER MATERIAL.

Application filed April 18, 1923. Serial No. 633,013.

*To all whom it may concern:*

Be it known that I, PIRL WARD HALL, a citizen of the United States, residing at Akron, in the county of Summit and State of Ohio, have invented a new and useful Mill for Grinding Rubber Material, of which the following is a specification.

Figure 1:
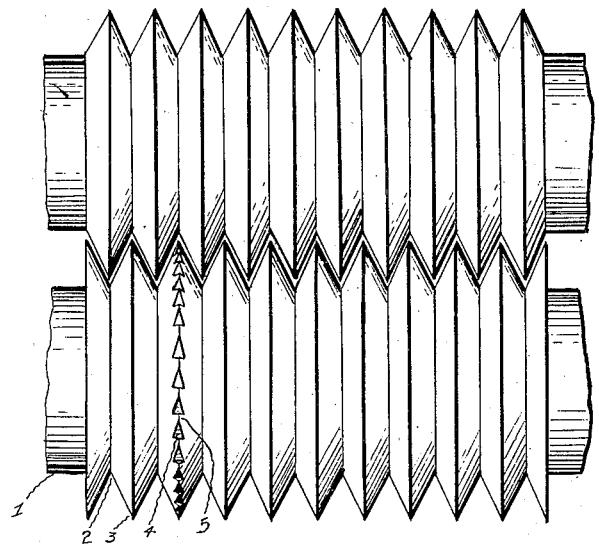
Figure 2:
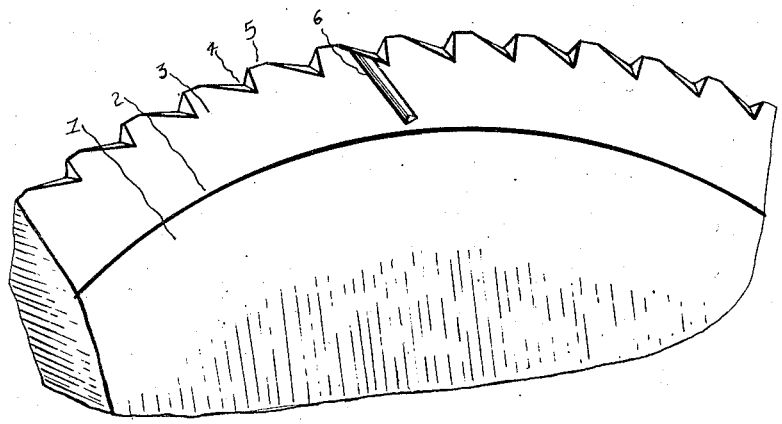

The invention relates to improvements in mills for grinding rubber material in which rolls having their surfaces formed with parallel encircling ridges, and said ridges having notches cut in the top portion, and said rolls being arranged in intermeshing relation; and the object of the improvements are, to provide a mill (for grinding up old tires and such for reclaiming rubber) with the crushing effect that the mill with the smooth surface rolls have, and also a drawing action on the material that the smooth surface rolls do not have. The form of the invention is illustrated in the accompanying drawing, in which Fig. 1, is a vertical elevation of the entire set of rolls showing how they are arranged in intermeshing relation; Fig. 2 is a section in perspective of one of the encircling ridges on an enlarged scale.

Parallel encircling grooves 2 are cut in the rolls 1 to form parallel and encircling ridges 3 that may or may not come to a peak. Notches 4 are cut in the top portion of said ridges to exert a drawing action on the material. The teeth 5 separate the material and drag it in. 6 are small grooves to help the grinding surface. The rolls can be made and used with or without the grooves 6.

I claim:

1. A roll for grinding rubber material having its surface formed with parallel encircling ridges, and said ridges having notches cut in the top portion to exert a drawing action on the material.

2. In a machine for grinding rubber material, a mill with its rolls having their surface formed with parallel encircling ridges, and said ridges having notches cut in the top portion to exert a drawing action on the material and said rolls being arranged in intermeshing relation.

PIRL WARD HALL.